United States Patent [19]

Whitney

[11] Patent Number: 5,454,240

[45] Date of Patent: Oct. 3, 1995

[54] AUTOMOBILE ANTI-THEFT DEVICE - THE SHIELD

[76] Inventor: Timothy E. Whitney, Jr., 1700 Cornsilk Cir., Virginia Beach, Va. 23456

[21] Appl. No.: 141,550

[22] Filed: Oct. 27, 1993

[51] Int. Cl.⁶ ................................................. B60R 25/02
[52] U.S. Cl. .............................. 70/209; 70/167; 70/226; 74/558
[58] Field of Search ......................... 70/209, 226, 207, 70/211, 212, 225, 237, 238, 257, 260, DIG. 58; 74/558

[56] References Cited

U.S. PATENT DOCUMENTS

| 1,154,389 | 9/1915 | Fogalsang | 70/158 |
|---|---|---|---|
| 1,195,548 | 8/1916 | Appleby | 70/209 |
| 1,329,913 | 2/1920 | McGuire | 70/209 |
| 1,368,054 | 2/1921 | Recher | 70/212 |
| 1,383,559 | 7/1921 | Lawson | 70/209 |
| 1,395,532 | 11/1921 | Tilden | 70/209 |
| 3,982,602 | 9/1976 | Gorman | 70/209 |
| 4,589,513 | 5/1986 | Proffitt | 70/252 X |
| 4,982,810 | 1/1991 | Toy | 70/237 |
| 5,025,646 | 6/1991 | Pack, Jr. | 70/237 |
| 5,031,429 | 7/1991 | Wang | 70/209 |
| 5,055,823 | 10/1991 | Fuller | 70/237 |
| 5,097,685 | 3/1992 | Lien | 70/209 |
| 5,128,649 | 7/1992 | Elmer | 70/237 X |
| 5,199,283 | 4/1993 | Chen | 70/209 |
| 5,199,284 | 4/1993 | Lin | 70/209 |
| 5,239,849 | 8/1993 | Gallardo | 70/209 |
| 5,259,222 | 11/1993 | Jang | 70/209 |
| 5,275,030 | 1/1994 | Cole | 70/209 |
| 5,297,406 | 3/1994 | Lin | 70/209 |
| 5,353,614 | 10/1994 | Anderson | 70/209 |

FOREIGN PATENT DOCUMENTS

| 919367 | 3/1947 | France | 70/212 |
|---|---|---|---|
| 2501134 | 9/1982 | France . | |
| 361686 | 11/1931 | United Kingdom | 70/207 |
| 2039840 | 8/1980 | United Kingdom | 70/209 |
| WO92/04211 | 3/1992 | WIPO | 70/209 |

Primary Examiner—Lloyd A. Gall
Attorney, Agent, or Firm—Plevy & Associates

[57] ABSTRACT

An anti-theft device for attachment to a steering wheel of an automobile, has a continuous metal shield, having a shield body which is accurately shaped to completely cover the top surface of the steering wheel and a shield body's side apron which is accurately shaped to completely surround the outer periphery of the steering wheel. The metal shield is configured to encase an elongate rigid security rod in diametrically opposed hump housings located on the face of the shield body. A pair of opposing hooks engage the rim of the steering wheel when the elongate rigid security rod is telescopically extended. Hook flanges extending from the underside of the shield body's apron engage the two hooks. A keyed lock secures the device to the steering wheel. Access to the keyed lock is provided by an access opening in the center of the shield body.

10 Claims, 6 Drawing Sheets 5,454,240

AUTOMOBILE ANTI-THEFT DEVICE - THE SHIELD

BACKGROUND OF THE INVENTION

The present invention relates to automobile security equipment, particularly to anti-theft devices for automobiles.

The prior art includes various security devices for automobiles which effectively disable the steering wheel by preventing its turning. Such prior steering wheel disabling devices may be divided into two general classes. The first includes steering wheel locking devices which comprise steering column interlocking or engaging components. Such prior devices are typically mechanically or electro-mechanically interconnected to the automobile ignition locking system. The second general classification of prior steering wheel locking devices includes those devices which comprise removable mechanical steering wheel engaging elements which come into movement-limiting contact with a fixed member of the automobile. The present invention is of the latter general classification of steering wheel locking devices.

Chen (U.S. Pat. No. 5,199,283) discloses an automobile steering lock which, in many ways, is typical of prior removable steering wheel-engaging security devices. The Chen device is popularly known and marked under the trade name "THE CLUB". Although these prior devices are advertised to prevent or deter automobile theft, such devices have several short-comings and, in many cases, have failed in this endeavor.

Most prior removable steering wheel-engaging security devices, such as the Chen device, comprise a rigid elongated portion and locking means for temporarily securing the rigid elongated portion to the steering wheel. The locking portion typically involves a lock and key set, and openable jaws which are adapted to engage the rim of the steering wheel. The rigid elongated portion typically comprises a hard metallic bar, or the like, which extends well beyond the rim of the steering wheel. When properly installed (i.e. locked into place) onto the rim of a steering wheel, the elongated bar prevents full and safe rotation of the steering wheel because, depending upon the design of the elongated portion and the make of the automobile, the elongated bar comes into a fixed member of the automobile (eg. the window, the door, the dash board, the windshield, etc.).

Clearly, proper operation of such prior devices depends on (1) the adequacy of the locking portion to tightly secure to the steering wheel rim, and (2) the strength of the elongated portion. Accordingly, such prior devices typically have over-designed, excessively strong locks, and have elongated portions constructed of excessively strong metal or composite materials.

Largely overlooked with prior removable steering wheel-engaging security devices is that, in order to defeat or bypass such devices, it is only necessary to cut (i.e. saw) the steering wheel rim at the point of attachment to the locking member. For example, in order to defeat the elongated steering wheel locking device of Chen (U.S. Pat. No. 5,199,283) it is only necessary to make one (or, at the most, two) small cuts in the rim of the steering wheel. Once the rim of the steering wheel is cut, the locking device is quite easily removed and the automobile can readily be steered. It will be appreciated by those skilled in the art that such prior removable steering wheel-engaging security devices can be defeated in such a manner, totally independent of the strength of lock or the hardness of the elongated portion.

SUMMARY OF THE INVENTION

Accordingly, it is a primary object of the present invention to provide a removable steering wheel-engaging security device which significantly and materially lessens the probability of the theft of an automobile.

Another object of the present invention is to provide a device of the character described which is easily visible from the exterior of a vehicle, and which may deter a potential thief from attempting to steal the vehicle equipped with this invention on its steering wheel.

Yet another object of the invention is to provide an apparatus of the character described that is not cumbersome, easy to use, and is inexpensive in relation to its benefits.

Another object of the present invention is to provide a removable steering wheel-engaging security device which provides greater anti-theft deterrence than prior devices, by preventing physical access to a steering wheel surface.

Another object of the present invention is to provide a removable steering wheel-engaging security device which prevents the removal of the device and protects the steering wheel from cutting, by way of hack saw, by denying a thief access to the surface of the steering wheel.

Another object of the present invention is to provide a removable steering wheel-engaging security device which provides a simple detachable device which is easily carried and stored within the vehicle and is easy to manufacture.

These together with other objects and advantages which will become subsequently apparent reside in the details of construction and operation as more fully hereinafter described and claimed, reference being made to the accompanying drawings forming a part hereof, wherein like numerals refer to like parts throughout.

DETAILED DESCRIPTION OF THE INVENTION

Figure 1:
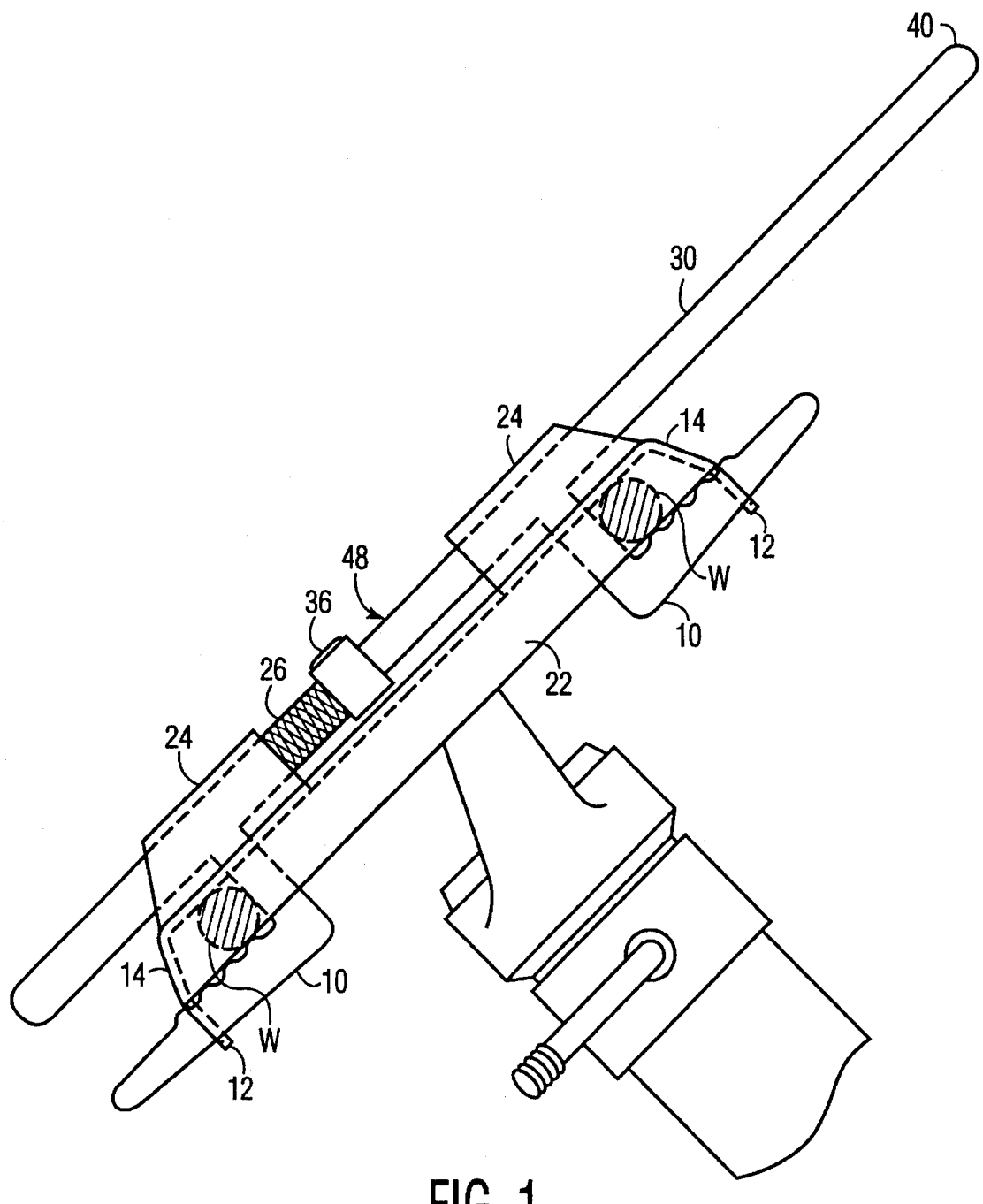
FIG. 1 is a side elevation view of the present invention shown installed on an automobile steering wheel.
Figure 2:
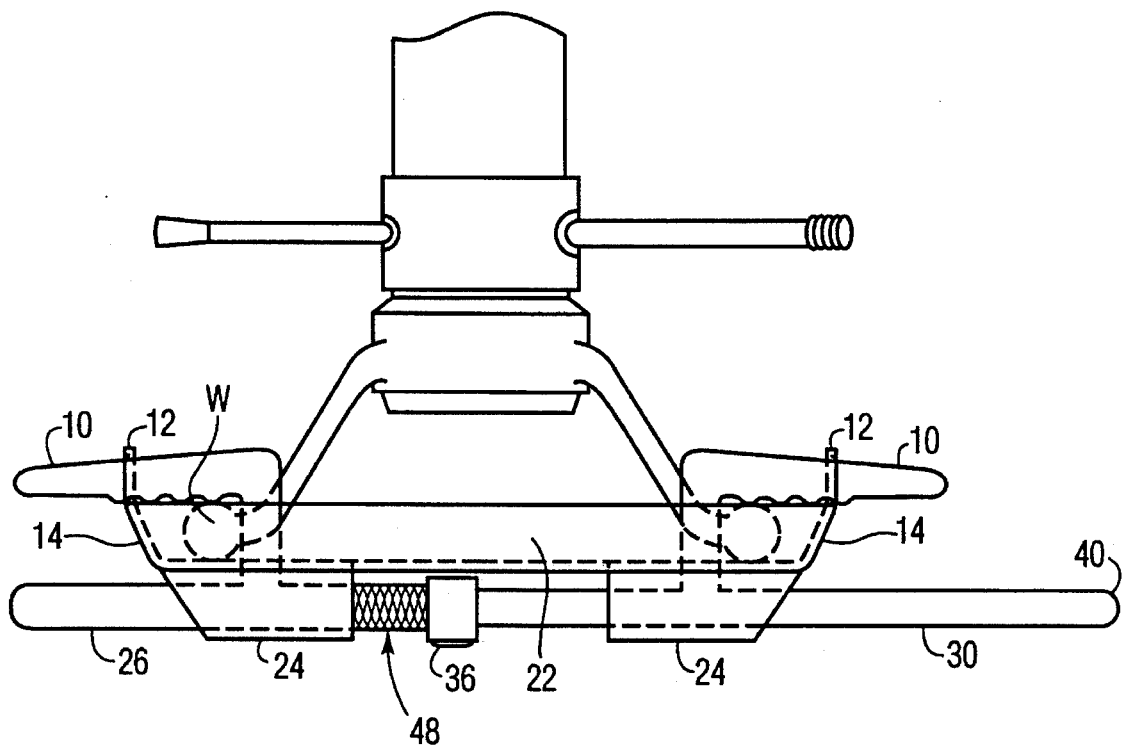
FIG. 2 is a plan view of one form of the invention as shown in FIG. 1.
Figure 3:
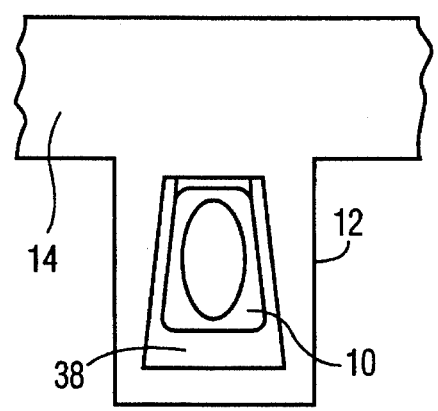
FIG. 3 is a side view of the security rod hook flanges located on the side apron of the invention.
Figure 4:
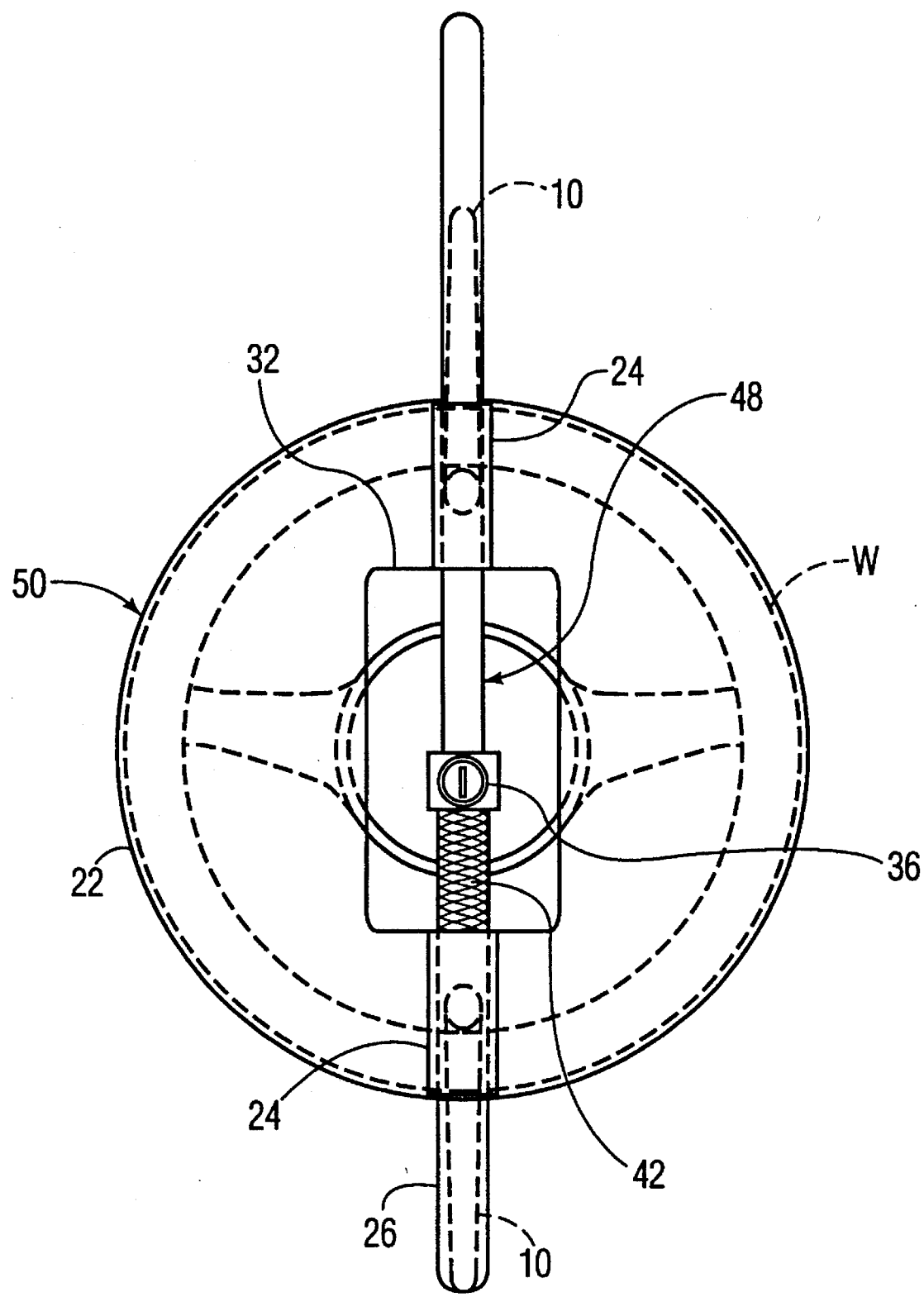
FIG. 4 is front elevation of the present invention shown installed on an automobile steering wheel.
Figure 5:
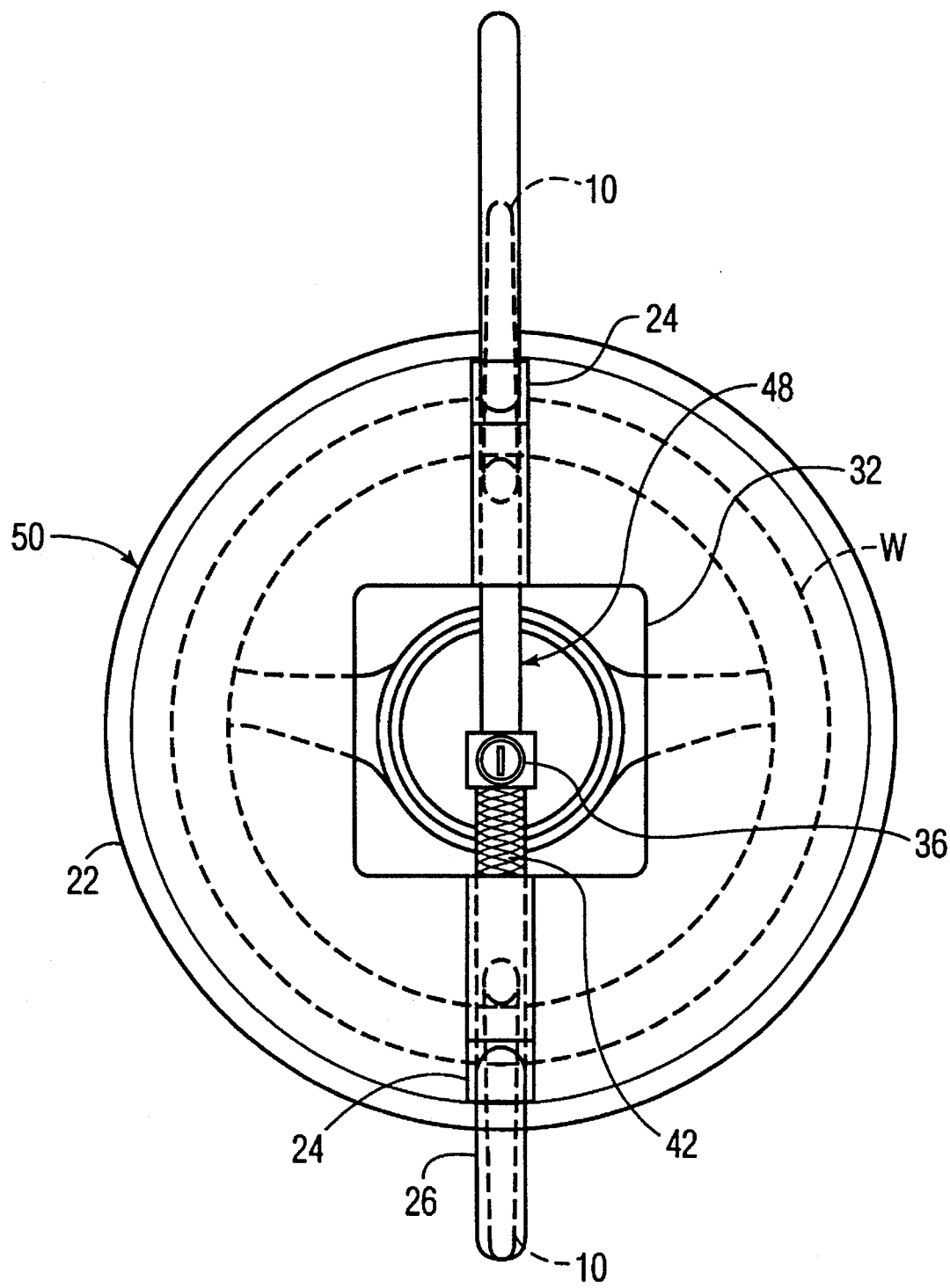
FIG. 5 is a top view of the present invention installed on an automobile steering wheel, shown in partial cross-section.

Referring to FIGS. 1 through 6, there is shown a rigid metal housing, or "shield" (generally designated (50) in the drawings), having a shield body (22) which is positioned in front of, and encompasses, the surface of a steering wheel (W), and a side apron (14) which extends around the side of the steering wheel (W). The shield body (22) has a predetermined configured opening (32) which is designed to allow manual access to a tubular security rod member (26) for placement on the steering wheel (W) and to facilitate adjustment of the telescopic security rod member (30). The shield opening (32) can be shaped, or configured to accommodate any style steering wheel, including, but not limited to, flat to convex configurations to accommodate any steering wheel configuration, including, but not limited to steering wheels with airbags.

A pair of security rod hump housings (24) are integrally formed on the shield body (22). The security rod hump housings are located at diametrically opposed positions on the face of the shield body (22). An adjustable telescopic security rod member (48) extends through both hump housings (24) and traverses the center of the shield body (22). The telescopic security rod member (48) comprises a first telescopic security rod member (30) telescopically engaged with a second tubular security rod member (26). Each telescopic security rod member extends through one of the hump housings. The adjustable security rod member (48) is immovable, and neither the telescopic security rod member (30) nor the tubular security rod member (26) can be removed or separated from their respective hump housings (24). The tubular security rod member (26) and the telescopic security rod member (30) have single welded steel security rod hooks (10) connected and attached at the diametrically opposed ends of the shield security rod members (26) and (30), respectively. A hand grip 40 is installed on the free end of the telescopic security rod member (30).

Figure 6:
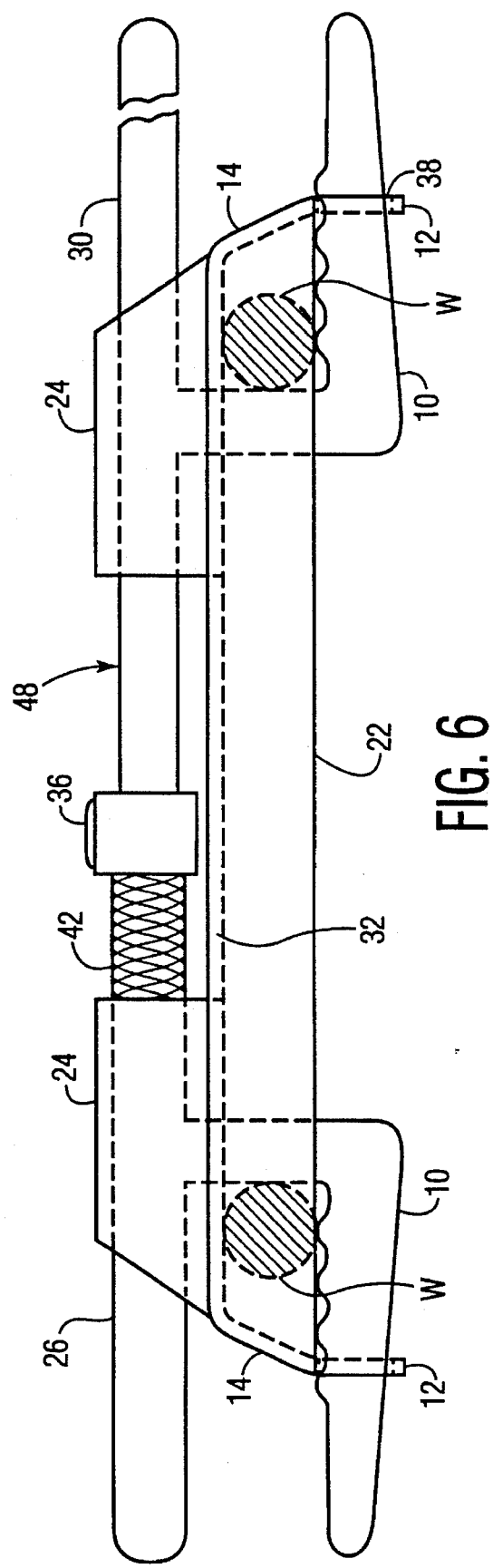
FIG. 6 is a side view of the invention as placed in its fixed position on a steering wheel.
Figure 7:
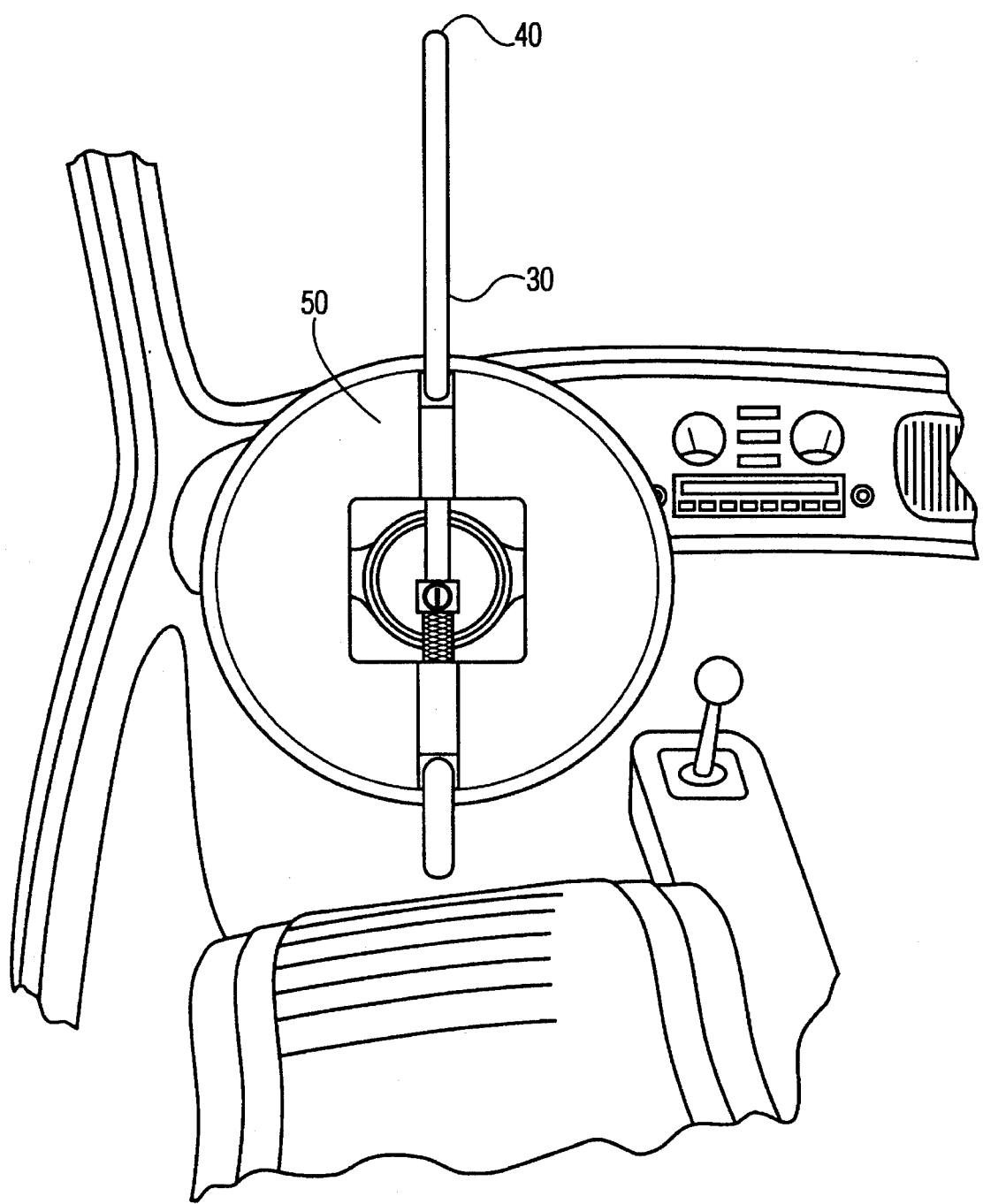
FIG. 7 shows the present invention mounted on a steering wheel of an automobile.

The telescopic security rod member 30, when extended to its maximum position on the steering wheel (W), allows the diametrically opposed security rod hooks (10) to snugly engage under the bottom, or under-surface of the steering wheel (W). The security rod hooks (10) will then insert themselves into the hook flange catches (12) which are located at diametrically opposed positions on the shield body's side apron (14). The telescopic security rod member (48) may be optimally extended on the steering wheel (W), by manually gripping the knurled hand grip (42) on the tubular security rod member (26), which is longitudinally connected to the telescopic security rod member (30) as shown in FIG. 6. The telescopic security rod member (48) will automatically lock in place by means of any well known locking mechanism (36) for locking a pair of telescoping tubular rods. In the preferred embodiment of the invention the telescopic security rod member (30) is long enough that, in operation, it extends sufficiently outboard of the rim of the steering wheel (W) to come into contact with a fixed member of the automobile (such as the door, or the dashboard, or the floor, or the windshield, etc.) when the steering wheel is turned.

The locking mechanism (36) can be configured and placed in any appropriate location on either the tubular security rod member (26) or on the telescopic security rod member (30).

The shield body (22) and its apron (14) are preferably constructed of a rigid metal, (such as steel), since the strength of this device is of paramount importance.

It will be understood from the foregoing description that a device constructed in accordance with the present invention provides a rigid metal anti-theft shield body (22) having an accurately contoured apron (14) with two diametrically opposed welded, or fixed hook flange catches (12), which, when placed on a steering wheel (W) completely covers the surface, rim, and periphery of the steering wheel.

The telescopic security rod member (30) and the tubular security rod member (26) together provide an immovable, albeit adjustable, security rod which together are designated as (48) in the drawings. This encased, immovable, adjustable steel security rod (48) traverses horizontally through the center of the shield body (22), and same is encased within security rod hump housings (24) that are designed to allow longitudinal (i.e. axial) telescopic movement of the telescopic security rod member (30). The security rod (48) is connected to the steering wheel (W) by single welded steel hooks (10), which are attached at diametrically opposed ends of the security rod (48). A configured access, or opening (32) in the center surface face of the shield body (22) is designed to allow manual access to the security rod (48) for its placement on the steering wheel (W), and to telescopically extend the hooks (10) into the shield body's hook flange catches (12). A mesh surface (42) is provided on the security rod (48) to facilitate manual gripping of the security rod.

Once fully extended, the diametrically opposed hooks (10) on the security rod (48) engage snugly under the bottom surface of the steering wheel (W), and then are inserted into the hook flange catches (12) located on the shield body's side apron (14), by telescopically extending the security rod (48) which automatically engages the security rod locking mechanism (36) after extending to its maximum position on the steering wheel (W). Once the shield (50) is securely fixed on the steering wheel (W), it will be readily apparent to any potential automobile thief that the vehicle will be too difficult, and, more importantly, too time consuming to attempt a theft of the vehicle, or to remove the shield (50) to gain access to the steering wheel in order to operate the vehicle. In particular, because the shield 50 completely surrounds the front and side of the steering wheel, it would be readily apparent to any potential automobile thief that the security device made in accordance with the present invention could not be removed from the steering wheel, for example, by simply making one or two saw cuts through the steering wheel's rim.

Although the description above contains the material specification of the invention, these should not be construed as limiting the scope of the invention, but as merely providing illustrations of the presently preferred embodiment of the invention. For example, the shield body (22) can be of several shapes other than circular, such as square, oval, concave, etc., the shield body's hook flanges located on the shield body's side apron (14), which engage the telescopic security rod hooks can have other shapes and locations on the shield body's side apron (14), and can be more than two as specified in the present invention, the shield body's aperture, or opening (32), can be any shape, or configuration, such as circular, oval, trapezoidal, square, rectangular, etc., to accommodate a particular steering wheel design; the metal shield (50) can be constructed of any rigid metal or combination metal/fiberglass composition, or other materials to provide the necessary body strength of the shield body (22) and the shield body's side apron (14).

Additionally, the security rod hump housings (24) may be of any configuration, such as square, round or concave, etc., and can be either flush with the surface of the shield body (22), or encased in any depth within said shield body, consistent with the operation and adjustment of the telescopic security rod.

Further, the number of security rod hooks, and their shape, or configuration, and the location, or position of the hooks on the telescopic security rod may vary in the invention.

The telescopic security rod shape can be round, square or of any specified length, weight or predetermined configuration consistent with the hump housings (24) which will accommodate the adjustment of the telescopic security rod (30), and which will secure the shield 50 to a steering wheel (W).

In addition, the locking means mechanism on the invention's telescopic security rod can be of any size, means or location on the security rod, or on the shield body, or a combination of both, consistent with the intended purpose of the invention to secure and fix the housing enclosure to a steering wheel, and to render the steering wheel unaccessible.

Further, since numerous modifications and changes will readily occur to those skilled in the art, it is not desired to limit the invention to the exact construction and operation shown and described, and, accordingly, all suitable modifications and equivalents may be resorted to, falling within the scope of the invention. Accordingly, the scope of the invention should be determined not by the embodiment illustrated, but by the appended claims and their legal equivalents.

I claim:

1. A locking device for a steering wheel of a vehicle, comprising shield means for substantially enclosing the steering wheel and telescoping means non-removably coupled to said shield means for substantially preventing the rotation of the steering wheel, said telescoping means comprising a pair of telescopically engaged rod members, one of said rod members including locking means for locking said rod members at a given length adjustment, wherein each of said rod members includes hook means for clamping said locking device to the steering wheel.

2. The locking device according to claim 1, wherein said shield means partially encloses said telescoping means.

3. The locking device according to claim 2, wherein said shield means comprises a shield body having an opening for allowing access to said telescoping means.

4. The locking device according to claim 1, wherein said shield means includes at least one flange, said at least one flange coacting with said hook means to clamp said locking device to the steering wheel.

5. The locking device according to claim 1, wherein said telescoping means makes contact with a fixed member of the vehicle when the steering wheel is rotated.

6. An anti-theft device for locking a steering wheel of a vehicle, comprising:

shield means for substantially enclosing the steering wheel;

telescoping means for contacting a fixed member of the vehicle when the steering wheel is rotated, said telescoping means including a pair of telescopically engaged rod members, one of said rod members including locking means for locking said rod members at a given length adjustment, wherein each of said rod members includes hook means for clamping said anti-theft device to the steering wheel; and housing means integrally formed with said shield means for non-removably coupling said telescoping means to said shield means.

7. The anti-theft device according to claim 6, wherein said housing means partially encloses said telescoping means.

8. The anti-theft device according to claim 6, wherein said shield means includes at least one flange, said at least one flange coacting with said hook means to clamp said anti-theft device to the steering wheel.

9. The anti-theft device according to claim 6, wherein said shield means includes an opening for allowing access to said locking means.

10. The anti-theft device according to claim 9, wherein said rod member further includes gripping means which is accessible through said opening in said shield means for extending said telescoping rod members to said given length of adjustment.

* * * * *